(12) United States Patent
Ichimiya

(10) Patent No.: US 7,936,986 B2
(45) Date of Patent: May 3, 2011

(54) IMAGE PICKUP APPARATUS CONTROL METHOD THEREOF AND IMAGE PICKUP SYSTEM

(75) Inventor: Takashi Ichimiya, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 146 days.

(21) Appl. No.: 12/304,512

(22) PCT Filed: Jan. 31, 2008

(86) PCT No.: PCT/JP2008/051998
§ 371 (c)(1),
(2), (4) Date: Dec. 12, 2008

(87) PCT Pub. No.: WO2008/093894
PCT Pub. Date: Aug. 7, 2008

(65) Prior Publication Data
US 2009/0202234 A1   Aug. 13, 2009

(30) Foreign Application Priority Data
Feb. 2, 2007   (JP) .................................. 2007-024590

(51) Int. Cl.
*G03B 3/00* (2006.01)
(52) U.S. Cl. ......................................................... 396/98
(58) Field of Classification Search .................. 396/89, 396/98; 348/340, 345; 250/201.2
See application file for complete search history.

(56) References Cited

U.S. PATENT DOCUMENTS

| | | | |
|---|---|---|---|
| 4,571,047 A * | 2/1986 | Hirai | 396/93 |
| 4,696,558 A * | 9/1987 | Karasaki et al. | 396/104 |
| 5,355,192 A * | 10/1994 | Kawasaki et al. | 396/82 |
| 6,363,220 B1 | 3/2002 | Ide | |
| 7,414,231 B2 | 8/2008 | Fukui | |
| 2005/0158044 A1 * | 7/2005 | Ide et al. | 396/71 |
| 2006/0066957 A1 * | 3/2006 | Fukui | 359/689 |

FOREIGN PATENT DOCUMENTS

| | | |
|---|---|---|
| JP | S62-174710 A | 7/1987 |
| JP | 2000-266988 A | 9/2000 |
| JP | 2000-275512 A | 10/2000 |
| JP | 2003-114374 A | 4/2003 |
| JP | 2005-208300 A | 8/2005 |
| JP | 2006-072084 A | 3/2006 |
| JP | 2006-098771 A | 4/2006 |
| JP | 2006-292981 A | 10/2006 |
| JP | 2006-343456 A | 12/2006 |

* cited by examiner

*Primary Examiner* — W. B. Perkey
*Assistant Examiner* — Noam Reisner
(74) *Attorney, Agent, or Firm* — Cowan, Liebowitz & Latman, P.C.

(57) ABSTRACT

An image-pickup apparatus (1) includes a light projection part (32, 33) projecting light to an object, a focus detection part (26) detecting a focus state, a light-source detection part 31 detecting information relating to a light source. When a focus detection is performed without lighting of the light projection part, a controller (100) generates information used for focusing control based on a focus state detection result and the information relating to the light source. When the focus detection is performed with lighting of the light projection part, the controller generates the information used for the focusing control based on the focus state detection result and correction information depending on a wavelength of the light projected from the light projection part without using the information relating to the light source. Thus, a highly-accurate AF control can be performed under various light sources including an AF assist light.

3 Claims, 11 Drawing Sheets

IMAGE PICKUP APPARATUS CONTROL METHOD THEREOF AND IMAGE PICKUP SYSTEM

TECHNICAL FIELD

The present invention relates to an image-pickup apparatus performing focusing control. More particularly, the present invention relates to an image-pickup apparatus that performs the focusing control depending on a determination result of a light source.

BACKGROUND ART

As an auto focusing (AF) method for an image-pickup apparatus such as a digital single-lens reflex camera, a so-called Through The Lens (TTL) phase-difference detection method has been known. In a camera using the TTL phase-difference detection method, light coming through an image-pickup lens is separated by a light-separating member such as a mirror and transmitted light is guided to an image-pickup system and reflected light is guided to a focus detection system.

As described above, in the camera using the TTL phase-difference detection method, the image-pickup system and the focus detection system are separately provided. This causes a problem as described below.

In the case of a general silver halide film, the image-pickup system generally has the highest spectral sensitivity characteristics to light of about 400 to 650 nm in order to provide the color reproducibility suitable for characteristics of human eyes.

On the other hand, silicon photo diode constituting an image-pickup device such as a CMOS sensor used for the image-pickup system generally has a sensitivity peak of about 800 nm and has the sensitivity up to about 1100 nm at the long-wavelength side.

However, in order to place importance on color reproducibility, light having a wavelength beyond the frequency range is blocked, causing some sacrifice in the sensitivity.

In the case of a photoelectric conversion device using the phase-difference detection method that is a sensor performing a focus detection, the sensitivity is generally up to about 1100 nm.

However, many photoelectric conversion devices have the sensitivity higher than 1100 nm by 100 nm in order to perform the focus detection even to a low luminance object and to allow a camera to project AF assist light in a near-infrared region (about 700 nm) under a low luminance to an object to perform an accurate focus detection.

FIG. 9 shows light-dividing sensitivities of various light sources, the image-pickup device, and the assist light. The horizontal axis represents a wavelength and the vertical axis represents a relative focal point depending on chromatic aberration of relative energy or lens.

In FIG. 9, C denotes the chromatic aberration of the image-pickup lens and B, G, and R denote light-dividing sensitivities of a blue pixel, a green pixel, and a red pixel of a primary-color-type image pickup device, respectively. F denotes a fluorescent light. L denotes a photoflood lamp. A denotes the light-dividing sensitivity of the above-described assist light.

As can be seen from FIG. 9, while the wavelength component of the fluorescent light includes substantially no wavelength components longer than 620 nm, the photoflood lamp shows a higher relative sensitivity toward the longer wavelength side.

On the other hand, the chromatic aberration C of the lens shows a different focal point depending on the wavelength and a longer focal length toward the longer wavelength side.

Thus, when the focus detection sensor having the highest sensitivity at 700 nm is used, the fluorescent light and the photoflood lamp having less long wavelength components cause a difference in detected focal points, causing a focal shift in the image-pickup device.

With regard to the problem described above in which the focal point detected by the focus detection system is shifted depending on the light-dividing sensitivity of the light source, a camera correcting the focal point is disclosed in Japanese Patent Laid-Open No. 2000-275512.

This camera compares outputs of two types of sensors having different light-dividing sensitivities to determine the type of the light source to correct the focal point to correct the focal shift due to the light-dividing characteristic.

Japanese Patent Laid-Open No. 62-174710 discloses a method in which the chromatic aberration amount of an interchangeable lens is stored in a memory in the lens and the defocus correction amount is calculated by multiplying a predetermined coefficient with the lens chromatic aberration amount based on the determination result of the type of the light source.

However, in the case of the auto-focusing cameras disclosed in Japanese Patent Laid-Open No. 2000-275512 and Japanese Patent Laid-Open No. S62-174710, a problem is caused where, when the type of the light source is determined while projecting the AF assist light, the focal point may be corrected in a wrong manner.

The focal shift due to the light-dividing wavelength when the AF assist light is projected will be described with reference to FIG. 10 and FIG. 11. FIG. 10 shows a relationship between a contrast pattern of the AF assist light and a position of the view field of the AF sensor (AF view field).

FIG. 11 shows pixel information obtained by the AF sensor when the AF assist light of FIG. 10 is projected. The horizontal axis represents a pixel position and the vertical axis represents the signal intensity of a pixel.

It is assumed that there is no contrast of an object and there is no contrast of pixel information only due to ambient light. The ambient light is assumed as light other than illumination light (AF assist light) from the camera side.

The AF assist light projects a predetermined contrast pattern light on ambient light and thus the AF assist light forms a contrast in pixel information. AF is performed based on this contrast.

In other words, when there is no object contrast or a low object contrast, the detection of a defocus amount is performed based on the contrast by the AF assist light. Thus, a focal shift due to the wavelength of only the AF assist light is caused.

Thus, in the case described above in which there is no object contrast or a low object contrast and the AF assist light is projected, the determination of the type of the light source must be subjected to the correction based on the wavelength of only the AF assist light except for the ambient light.

However, in the case of the auto-focusing cameras disclosed in Japanese Patent Laid-Open No. 2000-275512 and Japanese Patent Laid-Open No. S62-174710, the operation for the determination of the light source when the AF assist light is projected is not taken into consideration.

Furthermore, the auto-focusing cameras also cause, when the type of the light source is determined while projecting the AF assist light, the light source mixed with not only the AF assist light but also the ambient light to be determined, causing a wrong focal point correction.

The present invention provides an image-pickup apparatus, an image-pickup system, and a method for controlling an image-pickup apparatus by which a highly-accurate AF control can be performed under various light sources including the AF assist light.

DISCLOSURE OF INVENTION

An image-pickup apparatus as one aspect of the present invention includes a light projection part projecting light to an object, a focus detection part detecting a focus state of an image-pickup optical system, a light-source detection part detecting information relating to a light source, and a controller generating information used for focusing control of the image-pickup optical system.

When a focus detection is performed without lighting of the light projection part, the controller generates the information used for the focusing control based on a detection result of the focus state and the information relating to the light source, when the focus detection is performed with lighting of the light projection part, the controller generates the information used for the focusing control based on the detection result of the focus state and correction information depending on a wavelength of the light projected from the light projection part without using the information relating to the light source.

An image-pickup system including the image-pickup apparatus and an interchangeable lens that can be attached to and detached from the image-pickup apparatus also constitutes another aspect of the present invention.

Another aspect of the present invention is a method for controlling an image-pickup apparatus having a light projection part projecting light to an object, a focus detection part detecting a focus state of an image-pickup optical system, and a light-source detection part detecting information relating to a light source. The method includes a first step of performing a focus detection without lighting of the light projection part and a second step of performing the focus detection with lighting of the light projection part. The first step generates information used for the focusing control based on a detection result of the focus state and the information relating to the light source. The second step generates the information used for the focusing control based on the detection result of the focus state and correction information depending on a wavelength of the light projected from the light projection part without using the information relating to the light source.

BEST MODE FOR CARRYING OUT THE INVENTION

Hereinafter, preferred embodiments of the present invention will be described with reference to the drawings.

Embodiment 1

Figure 1:
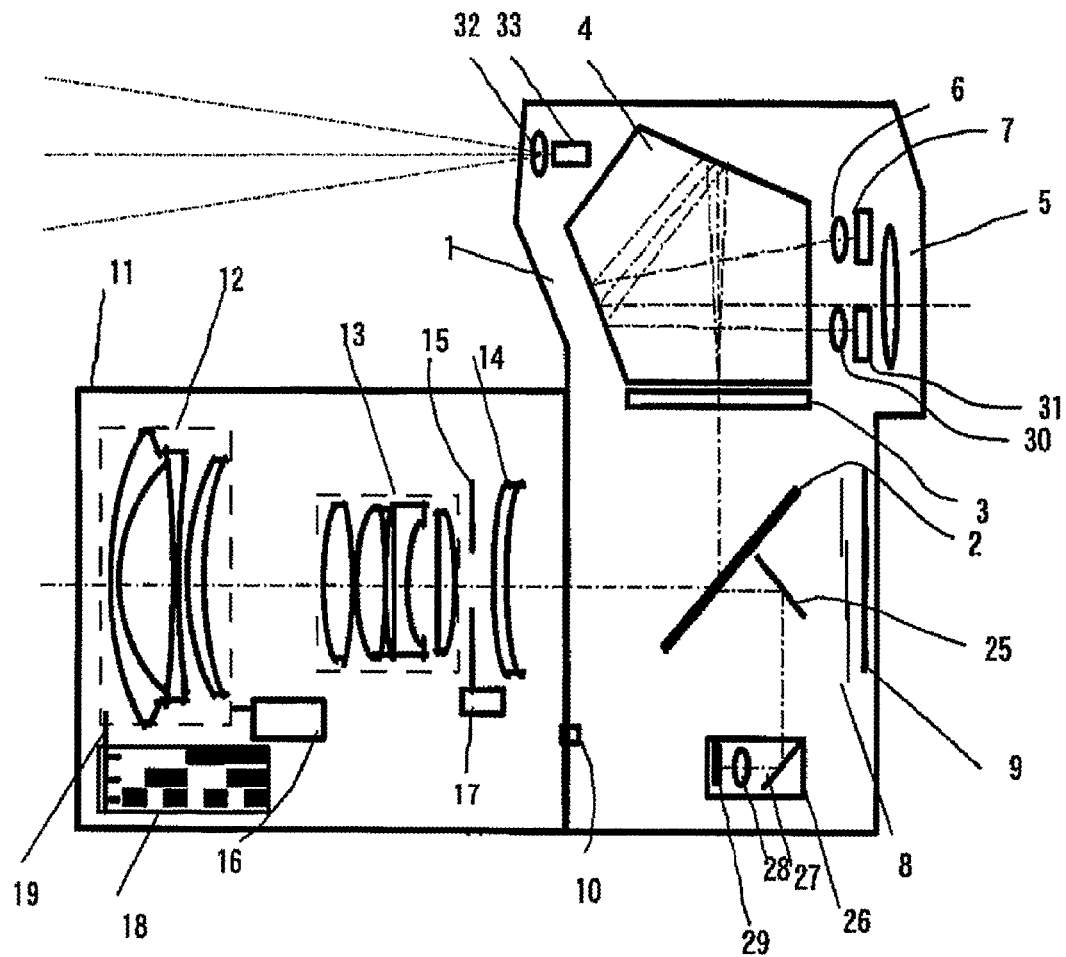
FIG. 1 is a schematic diagram showing the configuration of a single-lens reflex camera system that is an embodiment of the present invention.

FIG. 1 shows a single-lens reflex camera system (image-pickup system) that is Embodiment 1 of the present invention. This camera system is constituted by a single-lens reflex camera (image-pickup apparatus) 1 and an interchangeable lens (lens apparatus) 11 detachably attached to the camera 1.

In FIG. 1, the camera 1 stores therein an optical component, a mechanical component, an electric circuit, and an image-pickup device (or a film) for example so that an image (or a photograph) can be picked up.

Reference numeral 2 denotes a main mirror. The main mirror 2 is obliquely placed in an image-pickup optical path in a finder observation state and is retracted out of the image-pickup optical path in a photographing state.

The main mirror 2 serves as a half mirror. The main mirror 2 allows about a half of light flux from the object to be transmitted to a focus detection optical system (which will be described later) when being placed in the image-pickup optical path.

Reference numeral 3 denotes a focusing screen. The focusing screen 3 constitutes a part of a finder optical system and is placed at a predetermined image-forming plane of an image-pickup optical system (which will be described later).

Reference numeral 4 denotes a pentagonal prism for changing a finder light path. Reference numeral 5 denotes an eye piece. A photographer can observe the focusing screen 3 through a window of this eye piece to observe an object image.

Reference numerals 6 and 7 denote the first image-forming lens and a photometry sensor for measuring the object luminance within a finder observation screen. Reference numerals 30 and 31 denote the second image-forming lens and a light-source detection sensor for measuring the object luminance within the finder observation screen.

Reference numeral 8 denotes a focal-plane shutter. Reference numeral 9 denotes an image-pickup device and is constituted by a CCD sensor or a CMOS sensor.

Reference numeral 25 denotes a sub mirror. The sub mirror 25 is obliquely placed together with the main mirror 2 in the image-pickup optical path in a finder observation state and is evacuated out of the image-pickup optical path in an image pickup state.

This sub mirror 25 bends the light flux transmitted through the main mirror 2 placed within the image-pickup optical path in the lower direction to guide the light flux to a focus detection unit (which will be described later).

Reference numeral 26 denotes the focus detection unit. The focus detection unit 26 is constituted by the secondary image-forming mirror 27, the secondary image-forming lens 28, and a focus detection sensor 29.

The secondary image-forming mirror 27 and the secondary image-forming lens 28 constitute the focus detection optical system and form the secondary imaging surface of the image-pickup optical system on the focus detection sensor 29.

The focus detection unit 26 uses the so-called phase-difference detection method to detect the focus state of the image-pickup optical system (pixel information having a phase difference) to transmit the detection result to a camera microcomputer.

Reference numerals 32 and 33 denote a projection lens and an AF assist light source constituting a light projection part. Lighting the AF assist light source 33 causes the AF assist light having the contrast pattern to be projected to the object.

Reference numeral 10 denotes a mount contact point group that serves as a communication interface between the camera 1 and the interchangeable lens 11.

Reference numerals 12 to 14 denote lens units. The first lens unit (hereinafter referred to as focus lens) 12 is moved on an optical axis to perform focusing. The second lens unit 13 is moved on the optical axis to change the focal length of the image-pickup optical system to vary the magnification.

Reference numeral 14 denotes the fixed third lens unit. Reference numeral 15 denotes an aperture stop. Reference numeral 16 denotes a focus driving motor that moves the focus lens 12 in an optical axis direction during the AF. Reference numeral 17 denotes an aperture stop driving motor that changes an opening diameter of the aperture stop 15.

Reference numeral 18 denotes a distance encoder. The sliding of a brush 19 attached to the focus lens 12 on the distance encoder 18 reads the position of the focus lens 12 to generate a signal corresponding to the position information.

Figure 2:
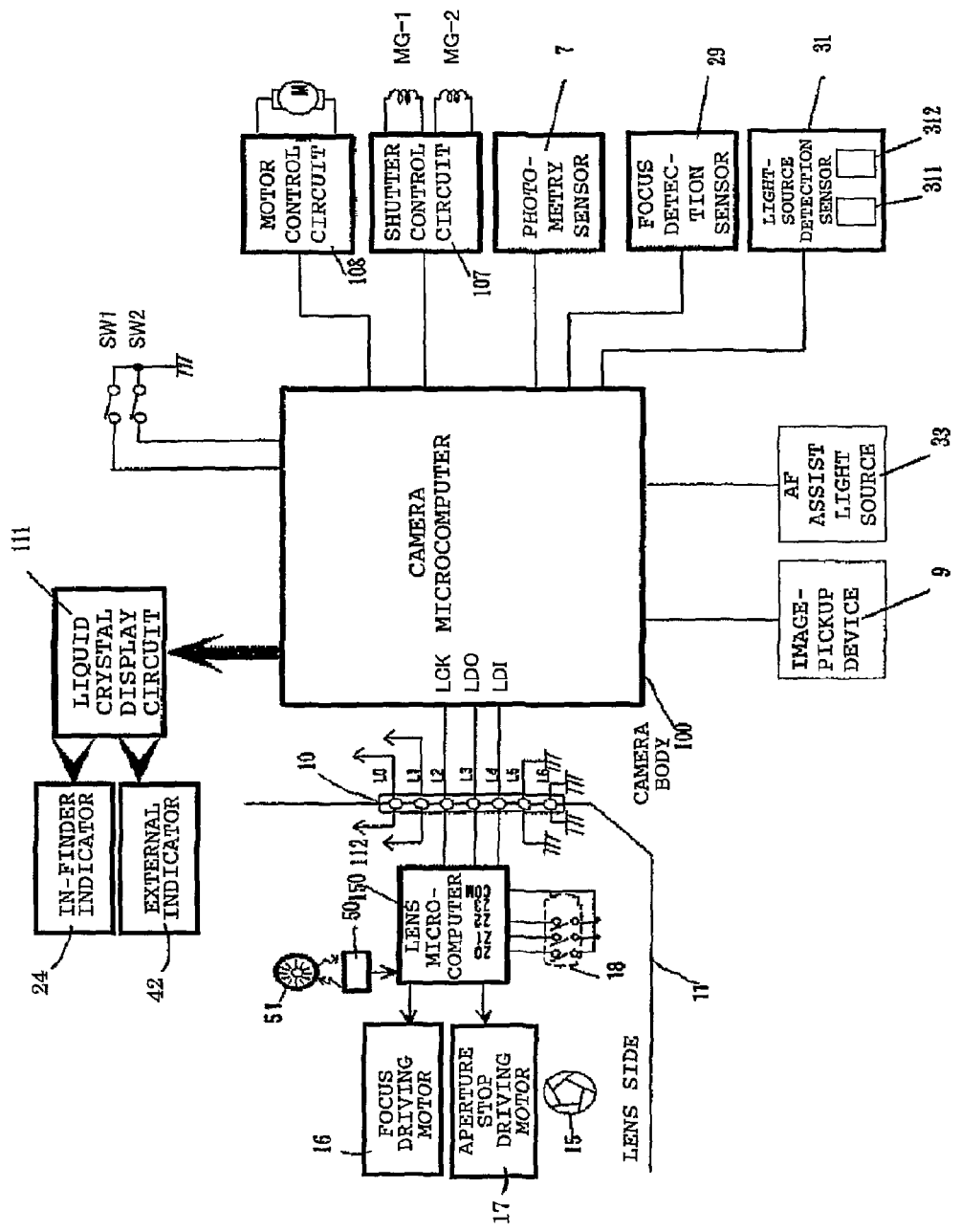
FIG. 2 is a block diagram showing an electric circuit architecture in a camera system of an embodiment.

Next, with reference to FIG. 2, the electric circuit architecture of the camera system will be described. In FIG. 2, the same components as those of FIG. 1 are denoted with the same reference numerals.

First, the circuit configuration in the camera 1 will be described. A camera microcomputer 100 is connected with the focus detection sensor 29, a photometry sensor 7, the light-source detection sensor 31, a shutter control circuit 107, a motor control circuit 108, and a liquid-crystal-display circuit 111.

The camera microcomputer 100 communicates with a lens microcomputer 150 placed in the interchangeable lens 11 via a mount contact point 10.

The light-source detection sensor 31 has two sensors of a visible light sensor 311 and an infrared light sensor 312 having different light-dividing wavelengths.

The light-source detection sensor 31 performs a charge accumulation control and a charge readout control to the visible light sensor 311 and the infrared light sensor 312 based on the signal from the camera microcomputer 100. Then, the light-source detection sensor 31 outputs luminance information obtained from the respective sensors 311 and 312 to the camera microcomputer 100.

The camera microcomputer 100 subjects the luminance information to an A/D conversion to generate a ratio between luminance values (luminance ratio) detected by the visible light sensor 311 and the infrared light sensor 312 as the information relating to the light source. This operation is also called as the light source detection operation.

The focus detection sensor 29 is constituted by a pair or a plurality of pairs of CCD line sensors and performs the charge accumulation control and the charge readout control of the line sensors in accordance with the signal from the camera microcomputer 100.

Then, the focus detection sensor 29 outputs the pixel information (information representing two images formed on the pair of line sensors) from the respective line sensors to the camera microcomputer 100.

The camera microcomputer 100 subjects the pixel information to the A/D conversion and detects the phase difference of the pixel information. Then, the camera microcomputer 100 calculates the defocus amount of the image-pickup optical system (i.e., the information used for the focusing control) based on the phase difference.

Then, the camera microcomputer 100 performs, as required, the correction depending on the light source of the defocus amount or the AF assist light as will be described later in detail.

Then, based on the defocus amount and the focus sensitivity information of the image-pickup optical system for example, the camera microcomputer 100 calculates the driving amount of the focus lens 12 (the driving amount of the focus driving motor 16) for obtaining an in-focus state.

The driving amount information of the focus lens 12 is transmitted to the lens microcomputer 150. The lens microcomputer 150 controls the focus driving motor 16 in accordance with the received driving amount information. As a result, the AF control in the interchangeable lens 11 is performed and the in-focus state is obtained.

The AF assist light source 33 projects the AF assist light having a specific contrast pattern to the object based on the signal from the camera microcomputer 100. This contrast pattern light provides an easier focus detection even when the object is dark or when there is no contrast.

The shutter control circuit 107 performs the energization control of a shutter front curtain driving magnet MG-1 and a shutter rear curtain driving magnet MG-2 constituting a focal-plane shutter 8 based on the signal from the camera microcomputer 100. As a result, the front curtain and the rear curtain of the shutter are run and an image-pickup device 9 (or a film) is exposed.

The motor control circuit 108 controls a mirror driving motor M based on the signal from the camera microcomputer 100. As a result, the up and down operations of the main mirror 2 and the charge operation of the focal-plane shutter 8 for example are performed.

SW1 denotes a switch that is turned on by the first stroke (halfway depression) operation of a not-shown release button to start the photometry and the AF.

SW2 denotes a switch that is turned on by the second stroke (full depression) operation of the release button to start the shutter running (i.e., exposure operation).

The camera microcomputer 100 reads not only the states of the switches SW1 and SW2 but also the states of not-shown operation members such as an ISO sensitivity setting switch, an aperture stop setting switch, and a shutter speed setting switch.

The liquid-crystal-display circuit 111 controls an in-finder indicator 24 and an external indicator 42 based on the signal from the camera microcomputer 100.

Next, the electric circuit architecture in the interchangeable lens 11 will be described. As described above, the interchangeable lens 11 and the camera 1 are electrically connected to each other via the mount contact point 10.

This mount contact point 10 includes a contact point L0 that is a power source contact point for the focus driving motor 16 and an aperture stop driving motor 17 in the interchangeable lens 11, a power source contact point L1 of the lens microcomputer 150, and a clock contact point L2 for performing serial data communication.

The mount contact point 10 also includes a data transmission contact point L3 from the camera 1 to the interchangeable lens 11, a data transmission contact point L4 from the interchangeable lens 11 to the camera 1, a motor ground contact point L5 to a motor power source, and a ground contact point L6 to a power source for the lens microcomputer 150.

The lens microcomputer 150 is connected to the camera microcomputer 100 via the mount contact point 10 and controls the focus driving motor 16 and the aperture stop driving motor 17 based on the signal from the camera microcomputer 100. Thus, focusing and light amount adjustment are performed.

Reference numerals 50 and 51 denote a light detector and a pulse plate. The pulse plate 51 is rotated by the focus driving motor 16. When the pulse plate 51 is rotated, the light detector 50 intermittently receives detection light to output pulse signals.

The lens microcomputer 150 counts the pulse number from the light detector 50 to obtain the position information of the focus lens 12 during the focusing.

The lens microcomputer 150 controls the focus driving motor 16 so that the position information of the focus lens 12 corresponds to the driving amount of the focus lens 12 for obtaining an in-focus state, which has been transmitted from the camera microcomputer 100, thereby performing focusing.

Reference numeral 18 denotes the above-described distance encoder. The position information of the focus lens 12 read by the distance encoder 18 is input to the lens microcomputer 150. The lens microcomputer 150 converts the position information to object distance information to send the object distance information to the camera microcomputer 100.

Figure 3:
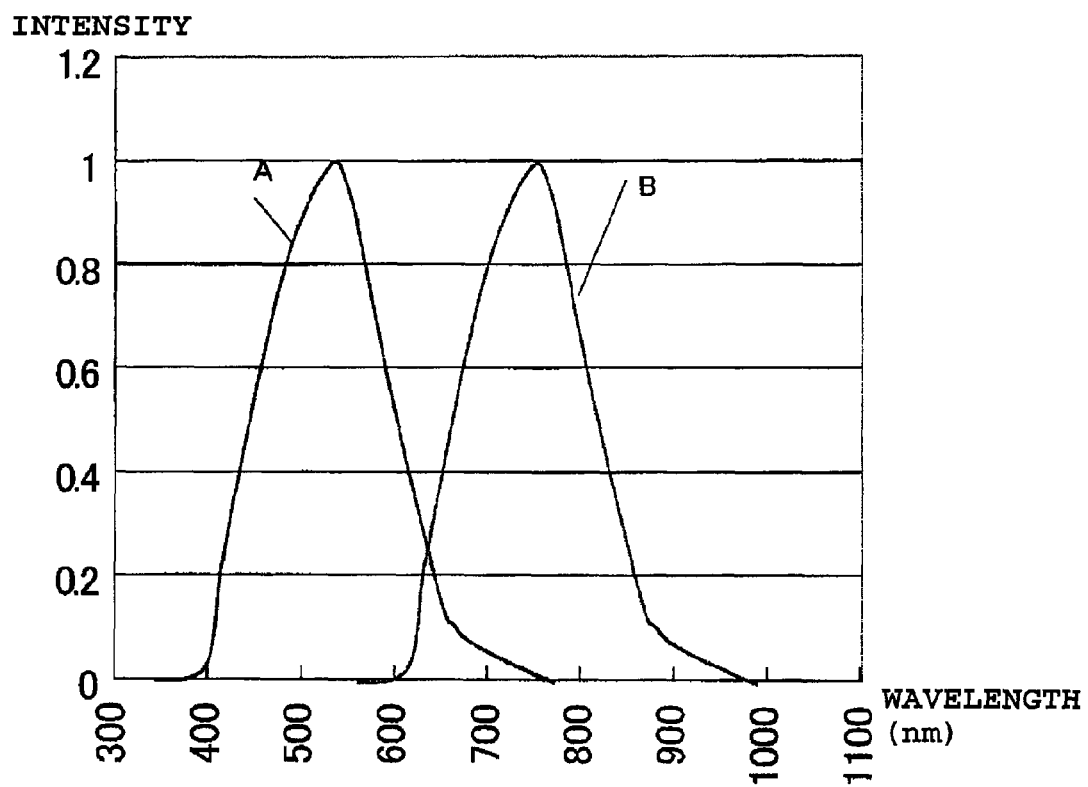
FIG. 3 shows light-dividing sensitivity characteristics of a visible light sensor and an infrared light sensor for sensing the light source used in the camera system of the embodiment.

Next, with reference to FIG. 3, the light-dividing characteristics of the visible light sensor 311 and the infrared light sensor 312 will be described. In FIG. 3, the horizontal axis represents a wavelength (nm) and the vertical axis represents the intensity. A denotes the light-dividing sensitivity characteristic of the visible light sensor 311 and B denotes the light-dividing sensitivity characteristic of the infrared light sensor 312.

As can be seen from FIG. 3, the visible light sensor 311 mainly detects light in a visible light region and the infrared light sensor 312 mainly has a peak sensitivity in a near-infrared region to detect light in a long wavelength region.

Figure 4:
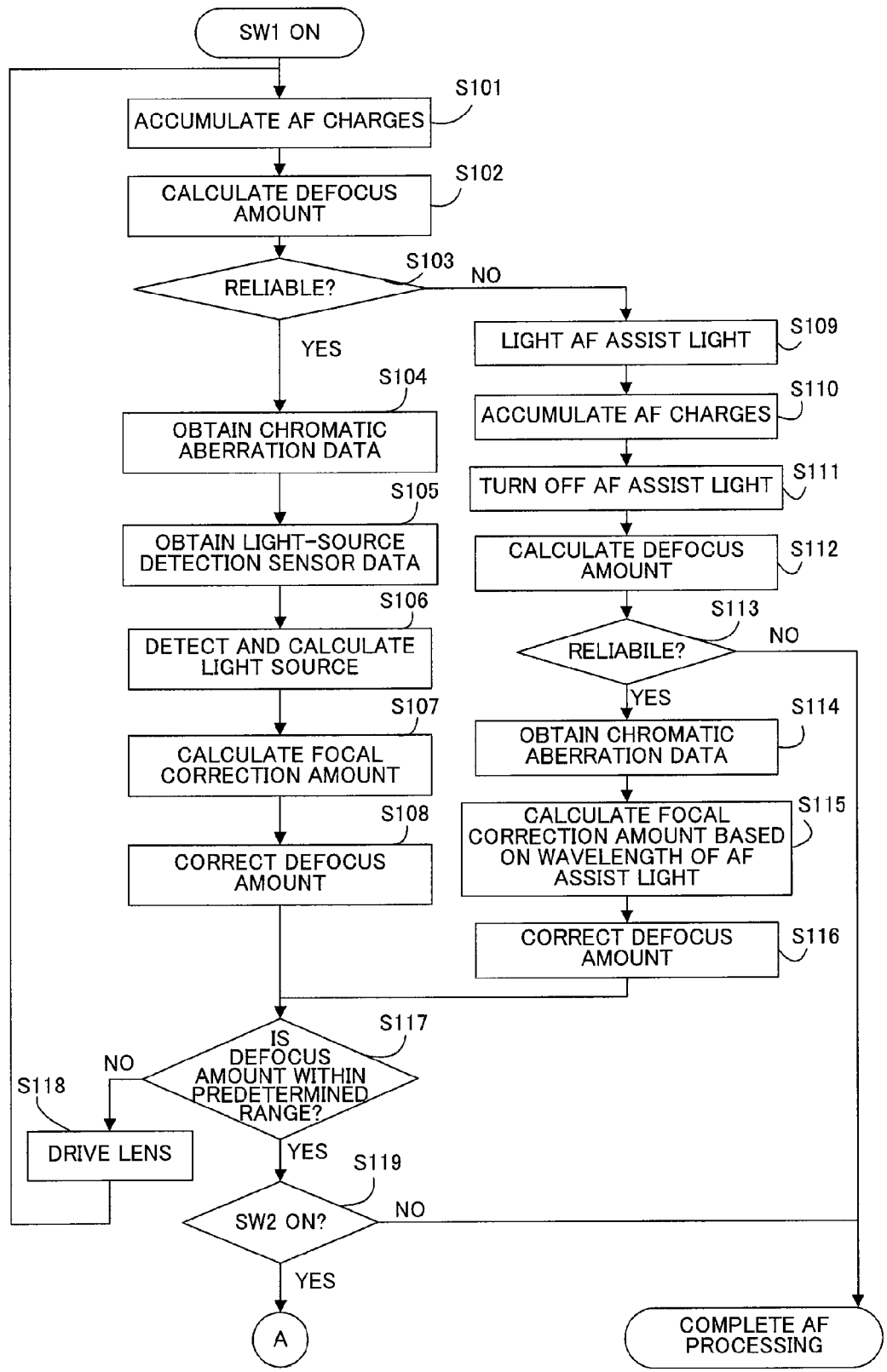
FIG. 4 is a flowchart showing an AF operation in a camera system of Embodiment 1.

Next, the AF operation of the camera system of the embodiment will be described with reference to a flowchart of FIG. 4. The AF operation is mainly executed by the camera microcomputer 100 as a controller based on a computer program.

When the SW1 of the camera 1 shown in FIG. 2 is turned on, the operation is started with Step 101 (shown as S in the drawings). The camera microcomputer 100 causes the charge accumulation by the focus detection sensor 29 to be performed and causes the pixel information depending on the focus state of the image-pickup optical system to be generated.

In Step 102, the camera microcomputer 100 calculates the defocus amount of the image-pickup optical system based on the obtained displacement of the pixel information (phase difference).

In Step 103, the camera microcomputer 100 calculates a reliability evaluation value of the pixel information obtained in Step 101 to determine the reliability of the detection result of the defocus amount calculated in Step 102.

When the calculated reliability evaluation value is equal to or higher than a predetermined value, the camera microcomputer 100 determines that the detection result has a high reliability to proceed to Step 104.

On the other hand, when the reliability evaluation value is lower than the predetermined value, the camera microcomputer 100 determines that the detection result has a low reliability to proceed to Step 109 to perform the AF operation by projecting the AF assist light.

The reliability evaluation value can be a difference between the detected maximum value and minimum values of the pixel information (amplitude of the pixel information) or an integration value obtained by the integration of differences in the level of neighboring pixel signals (the contrast of the pixel information).

In Step 104, the camera microcomputer 100 requests the lens microcomputer 150 to transmit the chromatic aberration amount data unique to the interchangeable lens (the image-pickup optical system). This request is transmitted to the lens microcomputer 150 via serial communication lines LCK, LDO, and LDI shown in FIG. 2.

On receiving the request, the lens microcomputer 150 firstly analyzes the contents of the request (communication).

When the request is the request for the transmission of the chromatic aberration amount data, the lens microcomputer 150 reads the chromatic aberration amount data depending on the current focal length and focus lens position of the image-pickup optical system from a not shown ROM table in the lens microcomputer 150.

The chromatic aberration amount data is previously measured to correspond to the focal length and focus lens position for each interchangeable lens and is stored in the ROM table. The lens microcomputer 150 returns the chromatic aberration amount data to the camera microcomputer 100 via the serial communication lines LCK, LDO, and LDI.

In Step 105 and 106, the camera microcomputer 100 drives the light-source detection sensor 31 and reads the luminance information from the visible light sensor 311 and the infrared light sensor 312.

Figure 7:
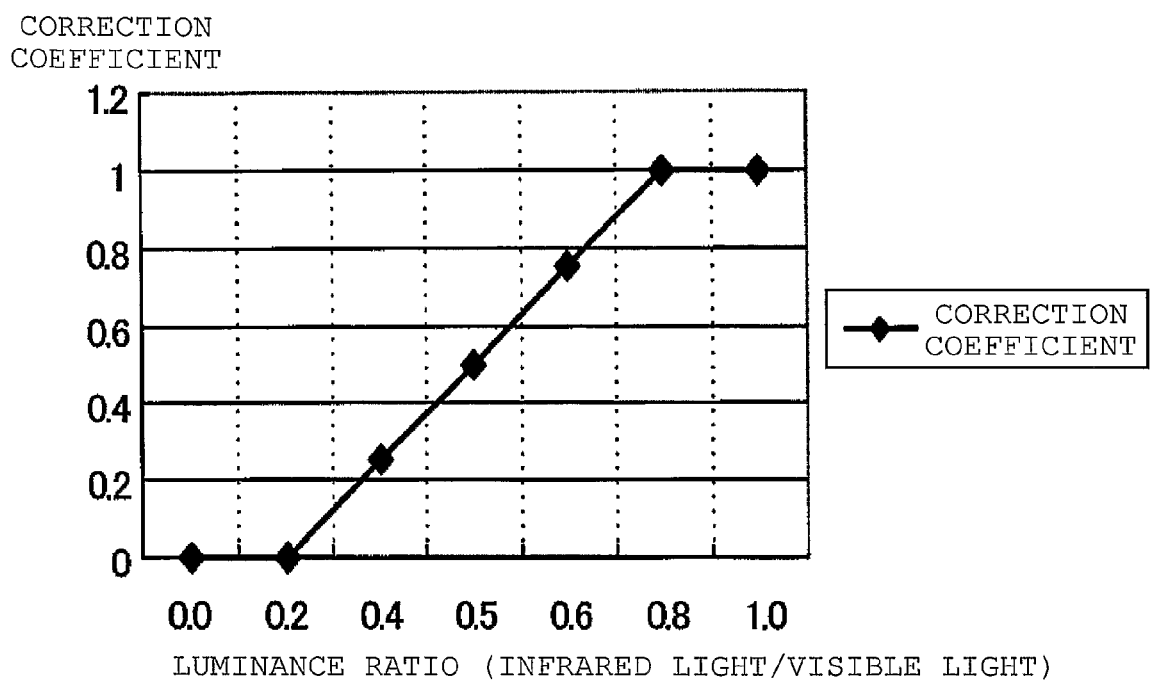
FIG. 7 shows correction coefficients to infrared light/visible light in the camera system of the embodiment.

Then, the camera microcomputer 100 calculates the ratio of pieces of the luminance information from the visible light sensor 311 and the infrared light sensor 312 (i.e., luminance ratio) to read the correction coefficient from the table shown in FIG. 7 in accordance with the luminance ratio (infrared light/visible light).

In Step 107, the camera microcomputer 100 multiplies the chromatic aberration amount data obtained in Step 104 with the correction coefficient calculated in Step 106 to calculate the first correction amount (the first correction information) that is the chromatic aberration amount data after the light source correction.

In Step 108, the camera microcomputer 100 adds the multiplication result (the first correction amount) in Step 107 to the defocus amount calculated in Step 102 to correct the defocus amount to calculate the defocus amount after the light source correction (hereinafter referred to as a light-source-corrected defocus amount).

To correct the defocus amount is to generate a new defocus amount (the light-source-corrected defocus amount). In this context, to correct the defocus amount in this embodiment can be restated to generate the defocus amount.

On the other hand, in Steps 109, 110, and 111, the camera microcomputer 100 drives the AF assist light source 33 and projects the AF assist light having the contrast pattern to a not shown object.

Then, the camera microcomputer 100 causes the charge accumulation by the focus detection sensor 29 to be performed and causes the pixel information depending on the focus state of the image-pickup optical system to be generated. Thereafter, the camera microcomputer 100 stops the driving of the AF assist light source 33.

In Step 112, the camera microcomputer 100 calculates the defocus amount of the image-pickup optical system based on the obtained displacement of the pixel information (phase difference).

In Step 113, the camera microcomputer 100 calculates the reliability evaluation value of the pixel information obtained in Step 110 to determine the reliability of the detection result of defocus amount calculated in Step 112.

When the calculated reliability evaluation value is equal to or higher than the predetermined value, the camera microcomputer 100 determines that the detection result has a high reliability to proceed to Step 114.

On the other hand, when the reliability evaluation value is lower than the predetermined value, the camera microcomputer 100 determines that the detection result has a low reliability to set AF-NG and then completes the AF operation.

In Step 114, the camera microcomputer 100 requests the lens microcomputer 150 to transmit the chromatic aberration amount data unique to the interchangeable lens (the image-pickup optical system). This request is transmitted to the lens microcomputer 150 via the serial communication lines LCK, LDO, and LDI shown in FIG. 2.

On receiving the request, the lens microcomputer 150 firstly analyzes the contents of the request (communication).

When the request is a request for the transmission of the chromatic aberration amount data, the lens microcomputer 150 reads the chromatic aberration amount data depending on the current focal length and focus lens position of the image-pickup optical system from a not shown ROM table in the lens microcomputer 150.

The lens microcomputer 150 returns the chromatic aberration amount data to the camera microcomputer 100 via the serial communication lines LCK, LDO, and LDI.

In Step 115, the camera microcomputer 100 multiplies the chromatic aberration amount data obtained in Step 114 with the correction coefficient in accordance with the wavelength of the AF assist light to calculate the second correction amount as the chromatic aberration amount data after the assist light correction (the second correction information).

The wavelength of the AF assist light is previously measured and the wavelength is stored in a not shown ROM table in the camera microcomputer 100. Then, the camera microcomputer 100 reads the correction coefficient table (the same table as the one of FIG. 7) depending on the wavelength to use the correction coefficient table. This can provide an appropriate defocus amount correction without causing an influence by the ambient light.

In Step 116, the camera microcomputer 100 adds the multiplication result (the second correction amount) in Step 115 to the defocus amount calculated in Step 112 to generate the corrected defocus amount by the AF assist light (hereinafter referred to as an assist-light-corrected defocus amount). Then, the camera microcomputer 100 proceeds to Step 117.

In Step 117, the camera microcomputer 100 determines whether the light-source-corrected defocus amount calculated in Step 108 or the assist-light-corrected defocus amount calculated in Step 116 is within a specific range or not.

When the light-source-corrected defocus amount calculated in Step 108 or the assist-light-corrected defocus amount calculated in Step 116 is within the specific range, the camera microcomputer 100 determines that an in-focus state is achieved and then proceeds to Step 119.

When the corrected defocus amount is larger than the specific range, the camera microcomputer 100 proceeds to Step 118 to calculate the driving amount of the focus lens 12 for obtaining an in-focus state based on the corrected defocus amount.

Then, the camera microcomputer 100 transmits the driving amount information to the lens microcomputer 150 via the above-described serial communication lines LCK, LDO, and LDI.

On receiving the driving amount information, the lens microcomputer 150 decides the driving direction of the focus driving motor 16 in accordance with the driving amount information to drive the focus driving motor 16.

Then, the processing returns to Step 101. The camera microcomputer 100 repeats the operations of the above-described respective steps until an in-focus state is determined in Step 117.

In Step 119, the camera microcomputer 100 determines whether SW2 is ON or not. When SW2 is ON, the camera microcomputer 100 proceeds to Step 201 shown in FIG. 5 to perform an image-pickup operation. When SW2 is OFF, the camera microcomputer 100 completes the processing of the AF operation.

Figure 5:
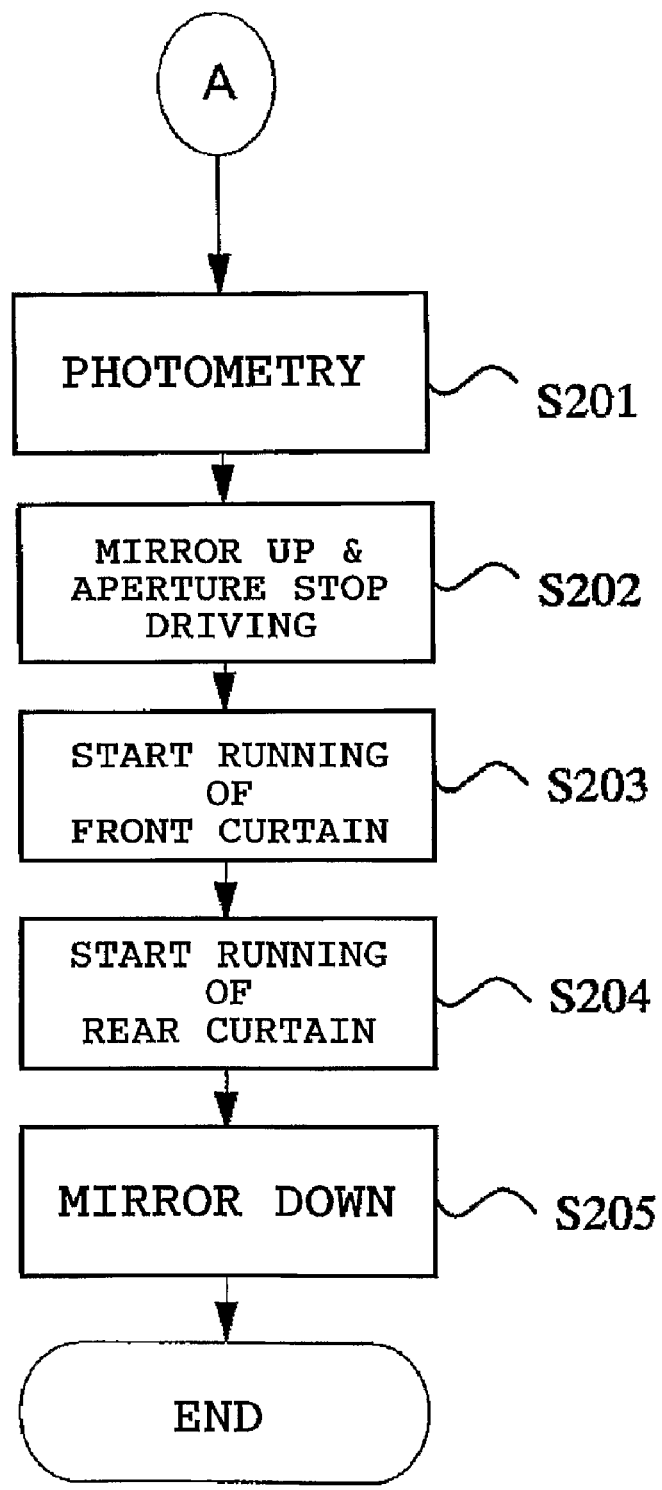
FIG. 5 is a flowchart showing an image-pickup operation in the camera system of Embodiment 1.

Next, with reference to FIG. 5, the image-pickup operation will be described. When SW2 is ON after the completion of the AF operation, the camera microcomputer 100 in Step 201 calculates an object luminance BV based on a photometry value from a photometry sensor 7 that measures the luminance of an object luminance.

Then, the camera microcomputer 100 adds the object luminance BV to a set ISO sensitivity SV to calculate an exposure value EV to calculate an aperture stop value AV and a shutter speed TV based on the exposure value EV.

In Step 202, the camera microcomputer 100 subjects the main mirror 2 to an up operation to evacuate the main mirror 2 from an image-pickup optical path.

At the same time, the camera microcomputer 100 instructs the lens microcomputer 150 to set the aperture stop 15 to the aperture stop value AV decided in Step 202. On receiving the instruction, the lens microcomputer 150 drives the aperture stop driving motor 17.

Thereafter, when the main mirror 2 is completely retracted from the image-pickup optical path, the camera microcomputer 100 in Step 203 energizes the shutter front curtain driving magnet MG-1 to start the releasing operation of the focal-plane shutter 8.

When the predetermined shutter-released time has elapsed, the camera microcomputer 100 proceeds to Step 204 to energize the shutter rear curtain driving magnet MG-2 to close the rear curtain of the focal-plane shutter 8. This completes the exposure of the image-pickup device 9.

In Step 205, the camera microcomputer 100 subjects the main mirror 2 to a down operation to place the main mirror 2 in the image-pickup optical path, thereby completing the image-pickup operation.

As described above, according to this embodiment, when the contrast pattern light like the AF assist light is projected to the object to perform AF, the light source detection operation is prohibited and the correction coefficient depending on the wavelength of the AF assist light is used to correct the defocus amount.

This can provide an appropriate defocus amount correction without causing an influence by the ambient light.

Embodiment 2

Figure 6:
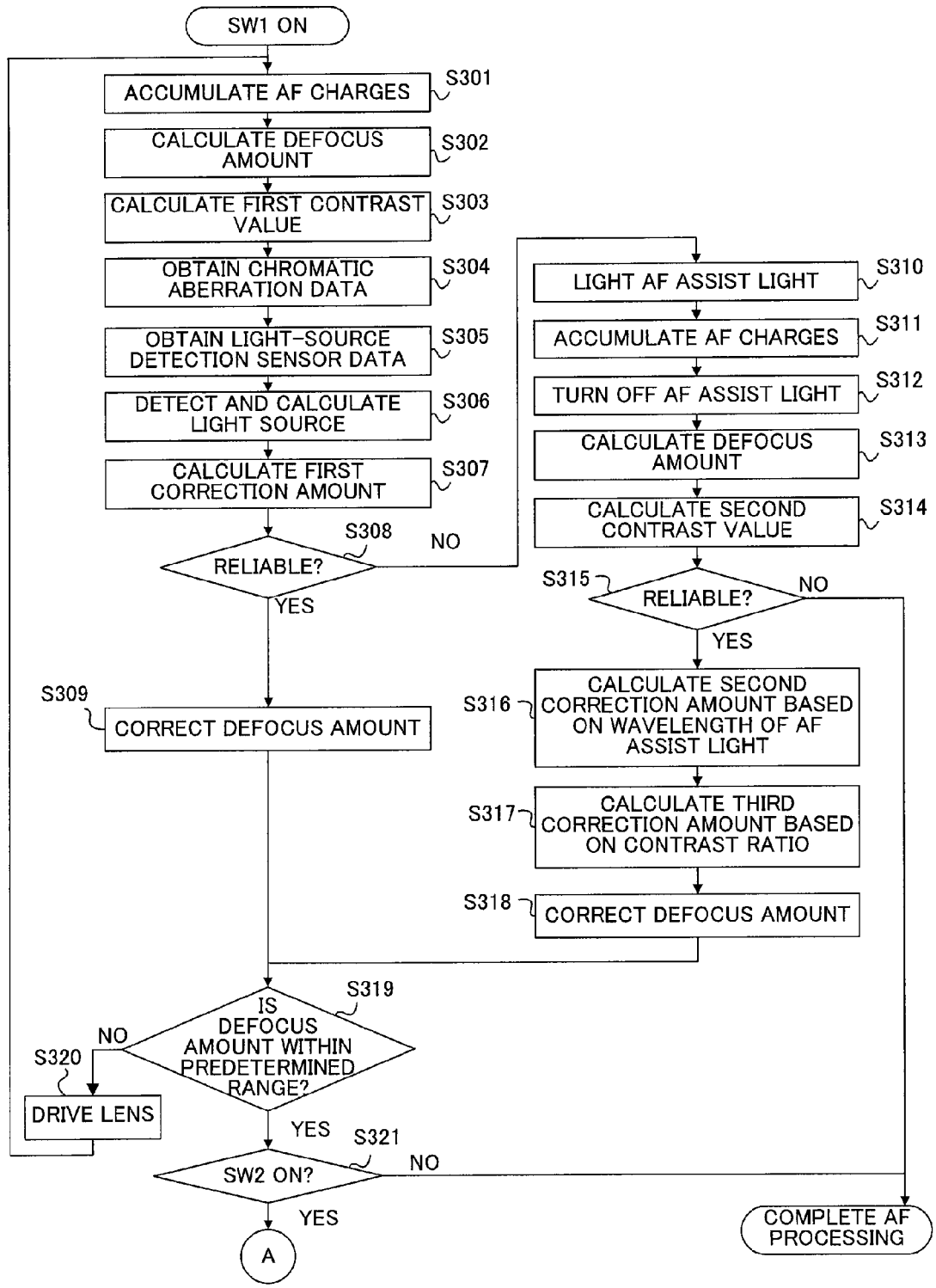
FIG. 6 is a flowchart showing the AF operation in a camera system of Embodiment 2.

FIG. 6 is a flowchart showing the AF operation in a camera system that is Embodiment 2 of the present invention. The camera system of the embodiment has the same structure as that of the camera system of Embodiment 1. Thus, the same components in this embodiment as those of Embodiment 1 are denoted with the same reference numerals of Embodiment 1.

When a switch SW1 of the camera 1 is turned on in FIG. 6, the camera microcomputer 100 starts the operation from Step 301. In Step 301, the camera microcomputer 100 causes the charge accumulation by the focus detection sensor 29 to be performed and causes the pixel information depending on the focus state of the image-pickup optical system to be generated.

In Step 302, the camera microcomputer 100 calculates the defocus amount of the image-pickup optical system based on the obtained displacement of the pixel information (phase difference).

In Step 303, the camera microcomputer 100 calculates the first contrast value (the first contrast information) owned by the pixel information calculated in Step 301. The first contrast value is obtained by calculating an integration value of differences in the level of neighboring pixel signals.

In Step 304, the camera microcomputer 100 requests the lens microcomputer 150 to transmit the chromatic aberration amount data unique to the interchangeable lens (the image-pickup optical system). This request is transmitted to the lens microcomputer 150 via the serial communication lines LCK, LDO, and LDI shown in FIG. 2.

On receiving the request, the lens microcomputer 150 firstly analyzes the contents of the request (communication).

When the request is a request for the transmission of the chromatic aberration amount data, the lens microcomputer 150 reads the chromatic aberration amount data depending on the current focal length and focus lens position of the image-pickup optical system from a not-shown ROM table in the lens microcomputer 150.

The chromatic aberration amount data is previously measured to correspond to the focal length and the focus lens position for each interchangeable lens and is stored in the ROM table. The lens microcomputer 150 returns the chromatic aberration amount data to the camera microcomputer 100 via the serial communication lines LCK, LDO, and LDI.

In Step 305 and Step 306, the camera microcomputer 100 drives the light-source detection sensor 31 to read the luminance information from the visible light sensor 311 and the infrared light sensor 312.

Then, the camera microcomputer 100 calculates the ratio of pieces of the luminance information from the visible light sensor 311 and the infrared light sensor 312 (i.e., the luminance ratio) to read the correction coefficient from the table shown in FIG. 7 in accordance with the luminance ratio (infrared light/visible light).

In Step 307, the camera microcomputer 100 multiplies the chromatic aberration amount data obtained in Step 304 with the correction coefficient calculated in Step 305 to calculate the first correction amount (the first correction information) that is the light-source-corrected chromatic aberration amount data.

In Step 308, the camera microcomputer 100 determines the reliability of the detection result of the defocus amount calculated in Step 302 by calculating the reliability evaluation value based on the pixel information obtained in Step 301 to determine that the detection result has the reliability when the reliability evaluation value is equal to or higher than the predetermined value to proceed to Step 309.

On the other hand, when the reliability evaluation value is lower than the predetermined value, the camera microcomputer 100 determines that the detection result has no reliability to proceed to Step 310 to perform the AF operation by the AF assist light.

The reliability evaluation value can be a difference between the detected maximum value and minimum values of the pixel information (amplitude of the pixel information) or the first contrast value calculated in Step 303.

In Step 309, the camera microcomputer 100 adds the first correction amount calculated in Step 307 to the defocus amount calculated in Step 302 to correct the defocus amount to calculate the defocus amount after the light source correction (hereinafter referred to as the light-source-corrected defocus amount). Then, the camera microcomputer 100 proceeds to Step 319.

On the other hand, in Step 310, 311 and 312, the camera microcomputer 100 drives the AF assist light source 33 to project the AF assist light having the contrast pattern to a not-shown object.

Then, the camera microcomputer 100 causes the charge accumulation by the focus detection sensor 29 to be performed and causes the pixel information depending on the focus state of the image-pickup optical system to be generated. Thereafter, the camera microcomputer 100 stops the driving of the AF assist light source 33.

In Step 313, the camera microcomputer 100 calculates the defocus amount of the image-pickup optical system based on the obtained displacement of the pixel information (phase difference).

In Step 314, the camera microcomputer 100 calculates the second contrast value owned by the pixel information obtained in Step 311 (the second contrast information).

In Step 315, the camera microcomputer 100 determines the reliability of the detection result of the defocus amount calculated in Step 313 by calculating the reliability evaluation value based on the pixel information obtained in Step 311 to determine that the detection result has the reliability when the reliability evaluation value is equal to or higher than the predetermined value to proceed to Step 316.

On the other hand, when the reliability evaluation value is lower than the predetermined value, the camera microcomputer 100 determines that the detection result has no reliability to set AF-NG and then completes the AF operation.

The reliability evaluation value can be a difference between the detected maximum value and minimum values of the pixel information (i.e., the amplitude of the pixel information) or the second contrast value calculated in Step 314.

In Step 316, the camera microcomputer 100 multiplies the chromatic aberration amount data obtained in Step 304 with the correction coefficient depending on the wavelength of the AF assist light to calculate the second correction amount that is the chromatic aberration amount data after the assist light correction (the second correction information).

As in Embodiment 1, the wavelength of the AF assist light is previously measured and is stored in a not-shown ROM table in the camera microcomputer 100. Then, the camera microcomputer 100 reads the correction coefficient from the correction coefficient table in accordance with the wavelength (the similar table as that in FIG. 7).

In Step 317 and 318, the camera microcomputer 100 uses the first contrast value and the second contrast value calculated in Step 303 and 314 to decide a weighting amount to the first correction amount and the second correction amount calculated in Step 307 and Step 316.

Then, based on the decided weighting amount, the camera microcomputer 100 calculates the third correction amount finally used for the defocus amount correction (the third correction information).

Figure 8A:
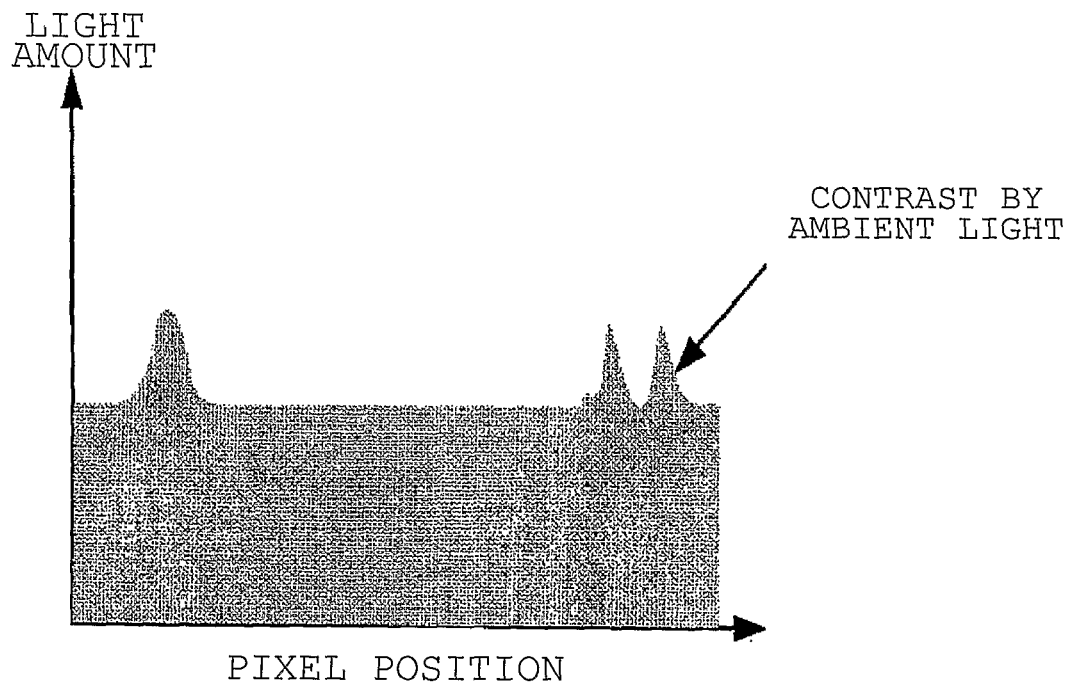
FIG. 8A shows an example of the pixel information when the AF assist light is not projected.

A method for calculating the third correction amount will be described with reference to FIG. 8A and FIG. 8B. FIG. 8A shows when no AF assist light is projected (i.e., the pixel information obtained through the accumulation operation of Step 301).

The horizontal axis represents the pixel position and the vertical axis represents the signal intensity of a pixel. Since no AF assist light is projected, a contrast only by the ambient light is formed.

Figure 8B:
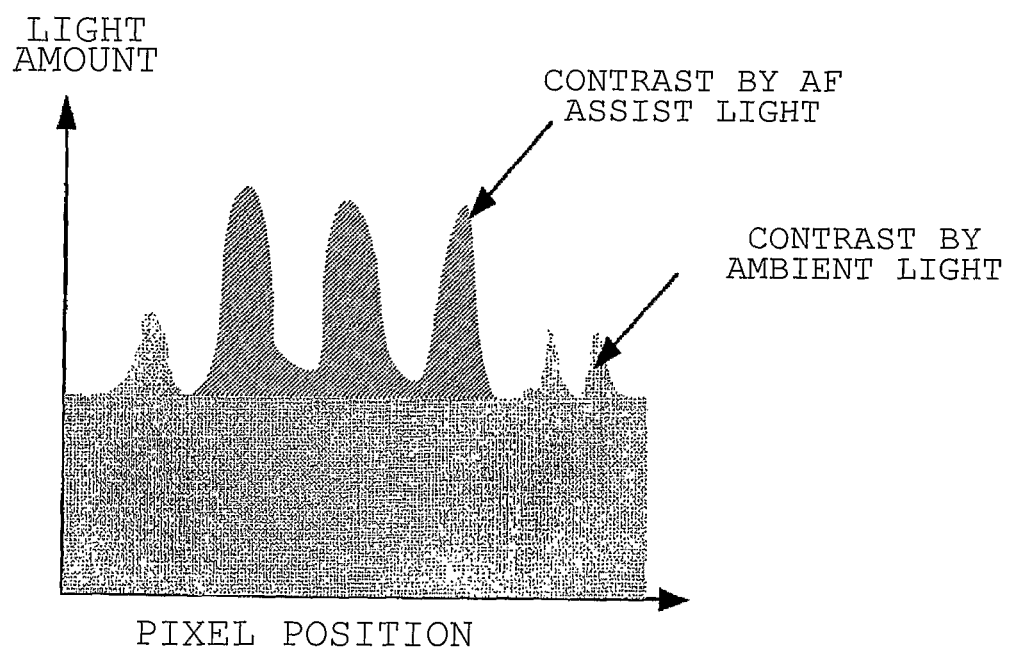
FIG. 8B shows an example of the pixel information when the AF assist light is projected.
Figure 9:
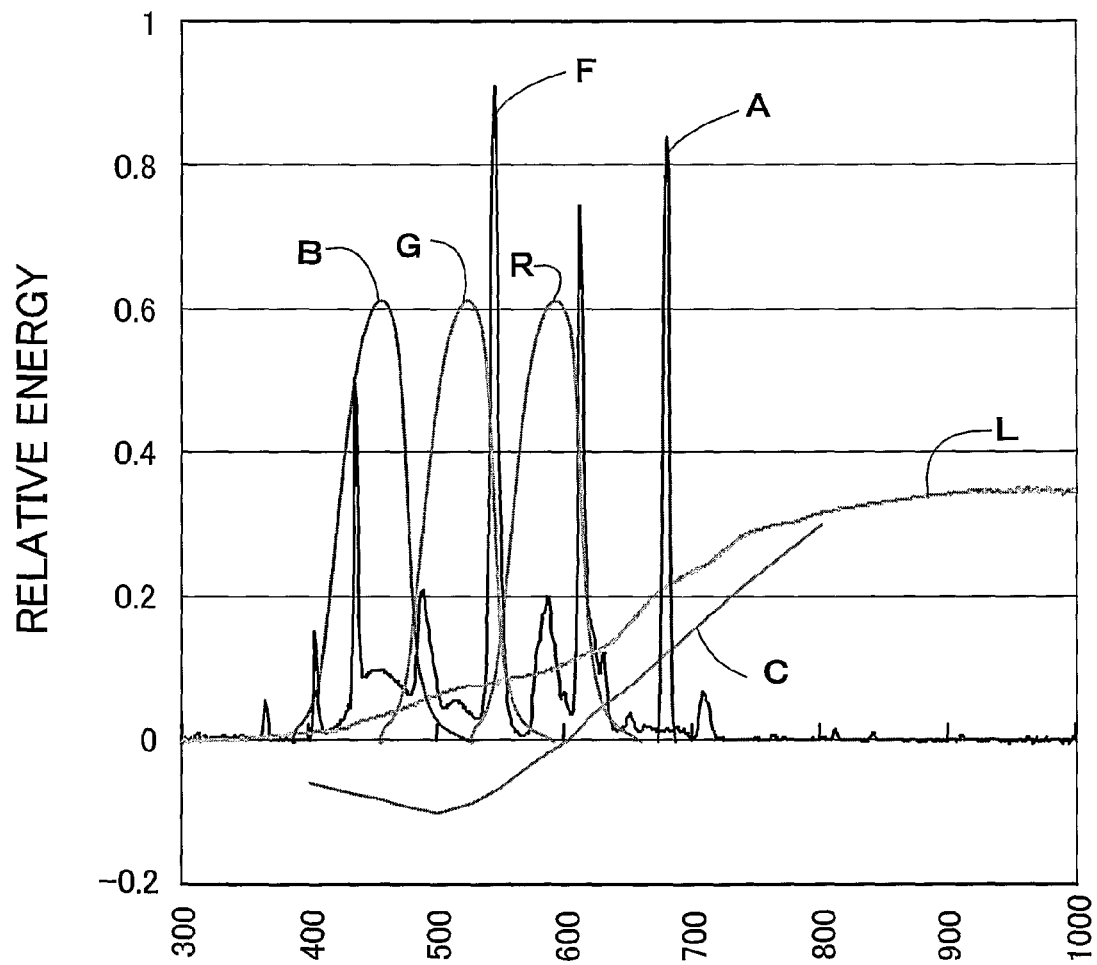
FIG. 9 shows the light-dividing sensitivities of the light source, the image-pickup device, and the assist light.
Figure 10:
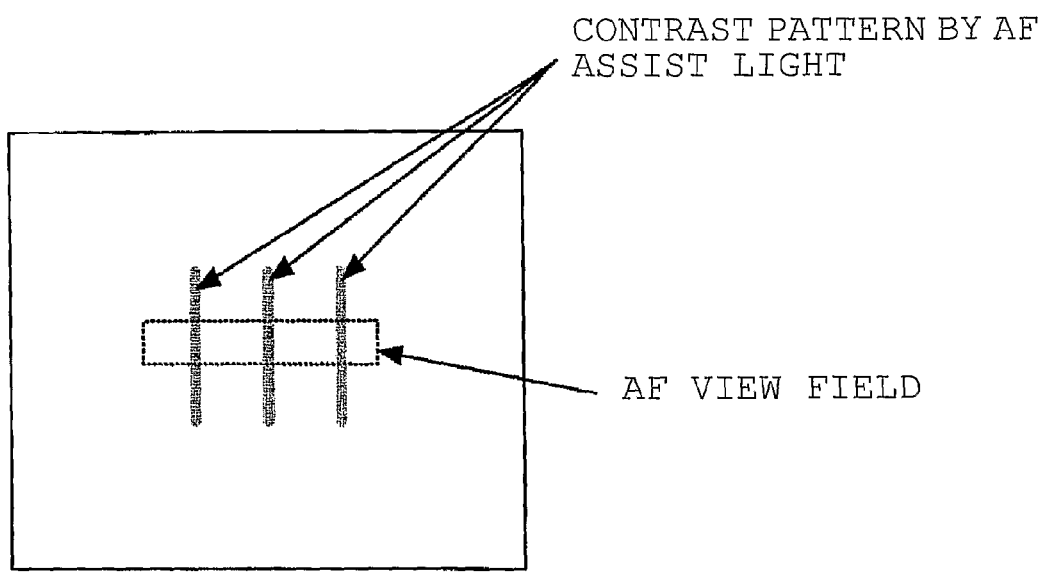
FIG. 10 shows a positional relationship between the contrast pattern of the AF assist light and the AF view field.
Figure 11:
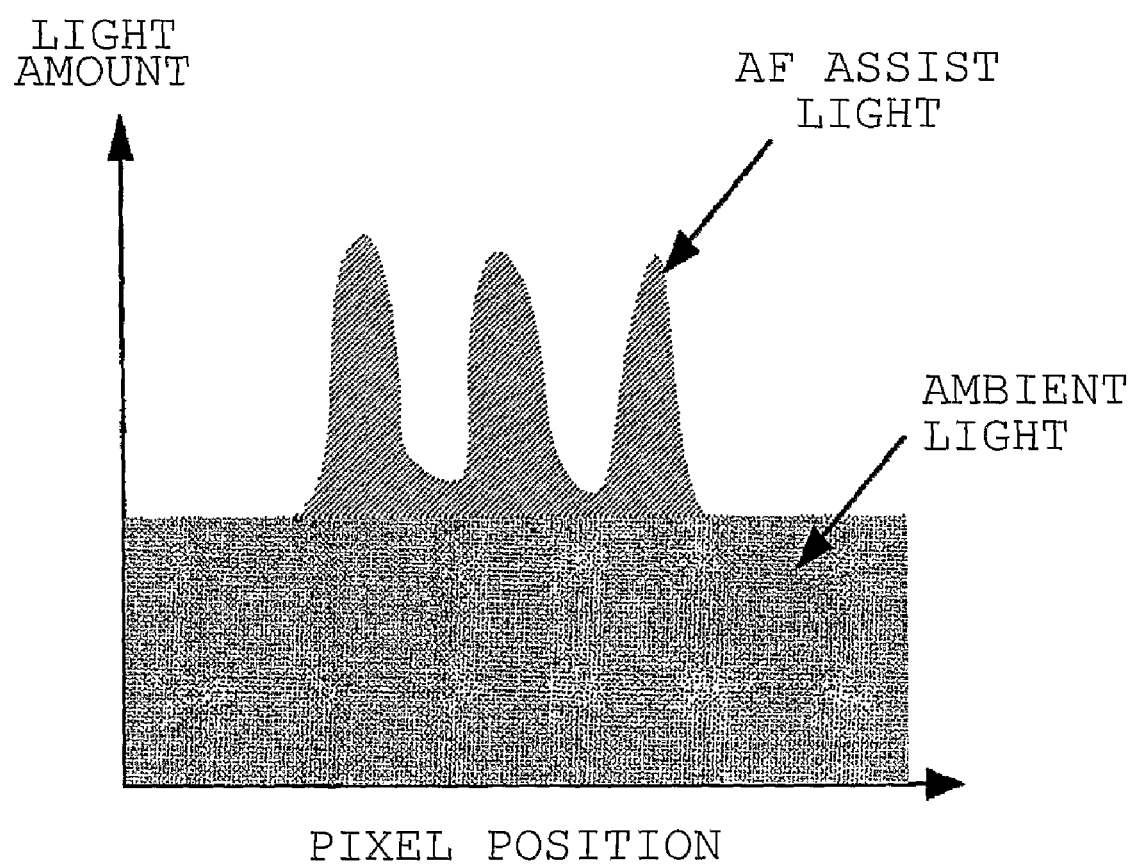
FIG. 11 shows the pixel information obtained by the AF sensor when the AF assist light of FIG. 10 is projected.

FIG. 8B shows when the AF assist light is projected (i.e., the pixel information obtained in the accumulation operation of Step 311). This provides an image signal obtained by adding the contrast by the contrast pattern of the AF assist light to the contrast formed by the ambient light.

The defocus amount (the defocus amount before the light source correction) detected based on this pixel information includes two components of a defocus component by the ambient light and a defocus component by the AF assist light.

An influence by these defocus components changes depending on a ratio of the contrast by the ambient light to the contrast by the AF assist light.

First, the camera microcomputer 100 calculates the third contrast value only by the contrast pattern of the AF assist light. The third contrast value is obtained by deducting the first contrast value calculated in Step 303 (the contrast by the ambient light) from the second contrast value calculated in Step 314 (the ambient light+the contrast by the AF assist light).

Then, in accordance with the ratio between the first contrast value and the third contrast value (the contrast only by the AF assist light), the camera microcomputer 100 decides the weighting amounts of the first correction amount and the second correction amount calculated in Step 307 and Step 316 to calculate the third correction amount.

When assuming that the first contrast value is CNT1, the third contrast value is CNT3, the first correction amount is COR1, and the second correction amount is COR2, the third correction amount COR3 is calculated by the following expression:

$$COR3 = COR1 \times CNT1/(CNT1+CNT3) + COR2 \times CNT3/(CNT1+CNT3)$$

Next, in Step 318, the camera microcomputer 100 adds the third correction amount calculated in Step 317 to the defocus amount calculated in Step 313 to correct the defocus amount to calculate the defocus amount after the correction by the AF assist light (hereinafter referred to as the assist-light-corrected defocus amount).

In Step 319, the camera microcomputer 100 determines whether the light-source-corrected defocus amount calculated in Step 309 or the assist-light-corrected defocus amount calculated in Step 318 is within the specific range or not.

When the light-source-corrected defocus amount calculated in Step 309 or the assist-light-corrected defocus amount calculated in Step 318 is within the specific range, the camera microcomputer 100 determines that an in-focus state is achieved and then proceeds to Step 321.

When the corrected defocus amount exceeds the specific range, the camera microcomputer 100 proceeds to Step 320 to calculate the driving amount of the focus lens 12 for obtaining an in-focus state based on the corrected defocus amount.

Then, the camera microcomputer 100 transmits the driving amount information to the lens microcomputer 150 via the above-described serial communication lines LCK, LDO, and LDI.

On receiving the driving amount information, the lens microcomputer 150 decides the driving direction of the focus driving motor 16 in accordance with the driving amount information to drive the focus driving motor 16. Then, the processing returns to Step 301 to repeat the operations of the respective steps until an in-focus state is determined in Step 319.

In Step 321, the camera microcomputer 100 determines whether SW2 is on or not. When SW2 is on, the camera microcomputer 100 proceeds to Step 201 shown in FIG. 5 to perform the image-pickup operation. When SW2 is off, the camera microcomputer 100 completes the processing of the AF operation.

As described above, according to this embodiment, when the AF assist light is projected to the object to perform the AF, the light source detection operation is prohibited and the defocus amount is corrected based on the correction information depending on the wavelength of the AF assist light and the correction information depending on the wavelength of an environment light source in the state where the AF assist light is not projected.

Further, the defocus amount is corrected based on the contrast of the pixel information obtained by projecting the AF assist light and the contrast of the pixel information obtained without projecting the AF assist light.

This can provide an appropriate defocus amount correction even when both of the contrast by the AF assist light and the contrast by the ambient light exist.

According to the respective embodiments, when the light from the light projection part is projected to the object to perform the focus detection, the information relating to the focusing control using the detection result of the information relating to the light source is not generated and the correction information depending on the wavelength of projected light is used to generate the information relating to the focusing control.

This can provide an appropriate focusing control without causing an influence by the ambient light. This can reduce the focal shift under various light sources including the projected light such as the AF assist light.

Although the respective embodiments described the single-lens reflex camera, the present invention can also be applied to a video camera that performs the AF based on the phase-difference detection method.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

FIELD OF INDUSTRIAL APPLICATION

The present invention provides an image-pickup apparatus in which a highly-accurate AF control can be performed under various light sources.

The invention claimed is:

1. An image-pickup apparatus comprising:
a light projection part projecting light to an object;
a focus detection part detecting a focus state of an image-pickup optical system;
a light-source detection part detecting information relating to a light source; and
a controller generating information used for focusing control of the image-pickup optical system,
wherein:
when the focus detection is performed without lighting of the light projection part, the controller generates first correction information based on an information relating to the chromatic aberration amount and the information relating to the light source and generates the information used for the focusing control based on the detection result of the focus state and the first correction information; and when the focus detection is performed with lighting of the light projection part, the controller generates second correction information based on an information relating to the chromatic aberration amount and a wavelength of the light projected from the light projection part and generates third correction information based on first contrast information obtained by a signal from the focus detection part without lighting of the light projection part, second contrast information obtained by a signal from the focus detection part with lighting of the light projection part, the first correction information, and the second correction information, and the controller further generates the information used for the focusing control based on the detection result of the focus state and the third correction information.

2. An image-pickup system comprising:
an image-pickup apparatus according to claim 1; and
an interchangeable lens that has an image-pickup optical system and that can be attached to and detached from the image-pickup apparatus.

3. A method for controlling an image-pickup apparatus including a light projection part projecting light to an object, a focus detection part detecting a focus state of an image-pickup optical system, and a light-source detection part detecting information relating to a light source, the method comprising:
a first step of performing a focus detection without lighting of the light projection part; and
a second step of performing the focus detection with lighting of the light projection part;

wherein the first step generates information used for the focusing control based on the detection result of the focus state and the information relating to the light source, and the second step generates the information used for the focusing control based on the detection result of the focus state and correction information depending on a wavelength of the light projected from the light projection part without using the information relating to the light source;

wherein:
the first step generates first correction information based on the received information relating to a chromatic aberration amount and the information relating to the light source and generates the information used for the focusing control based on the detection result of the focus state and the first correction information; and the second step generates second correction information based on the received information relating to a chromatic aberration amount and a wavelength of the light projected from the light projection part and generates the information used for the focusing control based on the detection result of the focus state and the second correction information;

wherein the second step generates third correction information based on first contrast information obtained by a signal from the focus detection part without lighting of the light projection part, second contrast information obtained by a signal from the focus detection part with lighting of the light projection part, the first correction information, and the second correction information, and the second step further generates the information used for the focusing control based on the detection result of the focus state and the third correction information.

* * * * *